(12) United States Patent
Wakahara

(10) Patent No.: US 8,041,185 B2
(45) Date of Patent: Oct. 18, 2011

(54) INFORMATION PROCESSING DEVICE AND METHOD, AND RECORDING MEDIUM

(75) Inventor: Tatsuya Wakahara, Tokyo (JP)

(73) Assignee: Sony Corporation (JP)

( * ) Notice: Subject to any disclaimer, the term of this patent is extended or adjusted under 35 U.S.C. 154(b) by 1235 days.

(21) Appl. No.: 09/930,756

(22) Filed: Aug. 16, 2001

(65) Prior Publication Data

US 2002/0085311 A1    Jul. 4, 2002

(30) Foreign Application Priority Data

Aug. 25, 2000  (JP) ............................... P2000-256253

(51) Int. Cl.
    *H04N 9/80*    (2006.01)
(52) U.S. Cl. ......................... 386/248; 386/252; 386/253
(58) Field of Classification Search ................ 386/1, 94, 386/201, 208; 360/60; 380/201, 208, 203
    See application file for complete search history.

(56) References Cited

U.S. PATENT DOCUMENTS

| | | | | |
|---|---|---|---|---|
| 4,945,563 A | * | 7/1990 | Horton et al. ................. | 380/203 |
| 5,164,839 A | * | 11/1992 | Lang .............................. | 386/54 |
| 5,737,477 A | * | 4/1998 | Tsutsumi ........................ | 386/83 |
| 5,781,246 A | * | 7/1998 | Alten et al. ..................... | 725/40 |
| 5,784,683 A | * | 7/1998 | Sistanizadeh et al. .......... | 725/73 |
| 5,867,224 A | | 2/1999 | Suh | |
| 5,940,071 A | * | 8/1999 | Treffers et al. ................ | 715/721 |
| 5,981,272 A | * | 11/1999 | Chang ........................ | 435/299.1 |
| 5,987,126 A | * | 11/1999 | Okuyama et al. ............. | 380/203 |
| 6,014,184 A | * | 1/2000 | Knee et al. ....................... | 725/45 |
| 6,166,778 A | * | 12/2000 | Yamamoto et al. ........... | 348/569 |
| 6,314,573 B1 | * | 11/2001 | Gordon et al. ................... | 725/61 |
| 6,381,747 B1 | * | 4/2002 | Wonfor et al. ................. | 725/104 |
| 6,486,920 B2 | * | 11/2002 | Arai et al. ...................... | 348/563 |
| 6,507,953 B1 | * | 1/2003 | Horlander et al. ............. | 725/105 |
| 6,633,723 B1 | * | 10/2003 | Kuroda et al. ................... | 386/94 |
| 6,681,015 B1 | * | 1/2004 | Hioki et al. .................... | 380/231 |
| 6,879,772 B1 | * | 4/2005 | Higurashi ........................ | 386/94 |
| 2002/0120927 A1 | * | 8/2002 | Harada et al. ................... | 725/23 |

FOREIGN PATENT DOCUMENTS

| | | |
|---|---|---|
| EP | 0 557 006 | 8/1993 |
| EP | 0 769 780 | 4/1997 |
| EP | 1 058 456 | 12/2000 |
| JP | 09214845 A | 8/1997 |

(Continued)

OTHER PUBLICATIONS

Office Action from Japanese Application No. 2000-256253, dated Jun. 15, 2010.

*Primary Examiner* — Thai Tran
*Assistant Examiner* — Gelek W Topgyal
(74) *Attorney, Agent, or Firm* — Lerner, David, Littenberg, Krumholz & Mentlik, LLP

(57) ABSTRACT

A system and method of determining the copy protection features of a program, and notifying a potential user of the program of these features, is provided. The copy protection features of the program first are analyzed. On the basis of this analysis, a message such as "this program cannot be recorded with IEEE1394, optical digital audio" is displayed to the user. By displaying such a message, the user can easily recognize that copy protection is applied to the program and that, for example, the program can be recorded (picture-recorded) in an analog style but cannot be digitally recorded. Accordingly, the user is easily made aware of the copy protection features of the program before using or purchasing the program.

24 Claims, 14 Drawing Sheets

FOREIGN PATENT DOCUMENTS

| | | |
|---|---|---|
| JP | 10004562 A | 1/1998 |
| JP | 10079925 A | 3/1998 |
| JP | 11341465 A | 12/1999 |
| JP | 2000100067 A | 4/2000 |
| WO | WO 97/28630 | 8/1997 |
| WO | WO 00/38420 | 6/2000 |

* cited by examiner

FIG. 1

| TYPE OF CONTENT | digital_copy_control_descriptor | | 1394 OUTPUT | | NTSC_VIDEO | D TERMINAL | OPTICAL DIGITAL | NOTE |
|---|---|---|---|---|---|---|---|---|
| | copy_control_type | digital_recording_control_data | MPEG_TS | IE C609-58 | | | | |
| DIGITAL TV SERVICE AND TEMPORARY PICTURE SERVICE | 01 | 00 | NO ENCIPHER EMI: 00 | NO ENCIPHER EMI: 00 | CGMS-A: COPY FREE MACROVISION: OFF | CGMS-A : COPY FREE | SCMS : COPY FREE | |
| | | 10 | ENCIPHER OUTPUT EMI: 10 | ENCIPHER OUTPUT EMI: 10 | CGMS-A: COPY ONCE MACROVISION: OFF | CGMS-A : COPY ONCE + APS | SCMS : COPY ONCE | RECEPTION OF MPEG-TS IS IMPOSSIBLE BY DEVICE OTHER THAN DTCP-SUPPORT EQUIPMENT |
| | | 01 | ENCIPHER OUTPUT EMI: 01 | ENCIPHER OUTPUT EMI: 01 | CGMS-A : COPY PROHIBIT MACROVISION: APS | CGMS-A : COPY PROHIBIT + APS | SCMS : COPY PROHIBIT | RECEPTION OF MPEG-TS IS IMPOSSIBLE BY DEVICE OTHER THAN DTCP-SUPPORT EQUIPMENT |
| | | 11 | ENCIPHER OUTPUT EMI: 11 | ENCIPHER OUTPUT EMI: 01 | CGMS-A : COPY PROHIBIT MACROVISION: APS | CGMS-A : COPY PROHIBIT + APS | SCMS : COPY PROHIBIT | RECEPTION OF MPEG-TS IS IMPOSSIBLE BY DEVICE OTHER THAN DTCP-SUPPORT EQUIPMENT |
| | 11 | 00 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 10 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 01 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 11 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | 10 OR 00 | 00 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 10 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 01 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 11 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| NO DESCRIPTOR | | | SCMS : COPY FREE | NO ENCIPHER EMI: 00 | CGMS-A: COPY FREE MACROVISION: OFF | SGMS-A : COPY FREE | SCMS : COPY FREE | |

▨ : THIS DESIGNATED PORTION SHOWS COMBINATIONS THAT ARE NOT DEFINED BY TRANSMISSION STIPULATIONS, AND ALSO SHOWS SUPPORT OF RECEIVER FOR ERRONEOUS TRANSMISSION

FIG. 2

| TYPE OF CONTENT | digital_copy_control_descriptor | | 1394 OUTPUT | | NTSC_VIDEO | D TERMINAL | OPTICAL DIGITAL | NOTE |
|---|---|---|---|---|---|---|---|---|
| | copy_control_type | digital_recording_control_data | MPEG_TS | IEC609-58 | | | | |
| AUDIO DIGITAL SERVICE AND TEMPORARY PICTURE SERVICE | 01 | 00 | OUTPUT IMPOSSIBLE | NO ENCIPHER EMI: 00 | CGMS-A: COPY FREE MACROVISION: OFF | CGMS-A : COPY FREE | SCMS : COPY FREE | |
| | | 10 | OUTPUT IMPOSSIBLE | ENCIPHER OUTPUT EMI: 10 | CGMS-A: COPY ONCE MACROVISION: OFF | CGMS-A : COPY ONCE + APS | SCMS : COPY ONCE | |
| | | 01 | OUTPUT IMPOSSIBLE | ENCIPHER OUTPUT EMI: 01 | CGMS-A : COPY PROHIBIT MACROVISION: APS | CGMS-A : COPY PROHIBIT + APS | SCMS: COPY PROHIBIT | |
| | | 11 | OUTPUT IMPOSSIBLE | ENCIPHER OUTPUT EMI: 01 | CGMS-A : COPY PROHIBIT MACROVISION: APS | CGMS-A : COPY PROHIBIT + APS | SCMS : COPY PROHIBIT | |
| | 11 | 00 | NO ENCIPHER EMI: 00 | SCMS : COPY FREE | CGMS-A: COPY FREE MACROVISION: OFF | CGMS-A : COPY FREE | SCMS : COPY FREE | |
| | | 10 | OUTPUT IMPOSSIBLE | SCMS : COPY ONCE | CGMS-A: COPY FREE MACROVISION: OFF | CGMS-A : COPY ONCE | SCMS : COPY ONCE | |
| | | 01 | OUTPUT IMPOSSIBLE | SCMS: COPY PROHIBIT | OUTPUT IMPOSSIBLE | CGMS-A : COPY PROHIBIT + APS | SCMS: COPY PROHIBIT | |
| | | 11 | OUTPUT IMPOSSIBLE | SCMS: COPY PROHIBIT | CGMS-A : COPY PROHIBIT MACROVISION: APS | CGMS-A : COPY PROHIBIT + APS | SCMS: COPY PROHIBIT | |
| | 10 OR 00 | 00 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 10 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 01 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 11 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | NO DESCRIPTOR | | NO ENCIPHER EMI: 00 | SCMS : COPY FREE | CGMS-A: COPY FREE MACROVISION: OFF | CGMS-A : COPY FREE | SCMS : COPY FREE | |

▨ : THIS DESIGNATED PORTION SHOWS COMBINATIONS THAT ARE NOT DEFINED BY TRANSMISSION STIPULATIONS, AND ALSO SHOWS SUPPORT OF RECEIVER FOR ERRONEOUS TRANSMISSION

FIG. 3

| TYPE OF CONTENT | digital_copy_control_descriptor | | 1394 OUTPUT | | NTSC_VIDEO | D TERMINAL | OPTICAL DIGITAL | NOTE |
|---|---|---|---|---|---|---|---|---|
| | copy_control_type | digital_recording_control_data | MPEG_TS | IE C609-58 | | | | |
| DIGITAL SERVICE AND TEMPORARY PICTURE SERVICE (DATA) | 01 | 00 | NO ENCIPHER EMI: 00 | NO ENCIPHER EMI: 00 | CGMS-A: COPY FREE MACROVISION: OFF | CGMS-A : COPY FREE | SCMS : COPY FREE | |
| | | 10 | ENCIPHER OUTPUT EMI: 10 | ENCIPHER OUTPUT EMI: 10 | CGMS-A: COPY ONCE MACROVISION: OFF | CGMS-A : COPY ONCE + APS | SCMS : COPY ONCE | |
| | | 01 | ENCIPHER OUTPUT EMI: 01 | ENCIPHER OUTPUT EMI: 01 | CGMS-A : COPY PROHIBIT MACROVISION: APS | CGMS-A : COPY PROHIBIT + APS | SCMS: COPY PROHIBIT | |
| | | 11 | ENCIPHER OUTPUT EMI: 01 | ENCIPHER OUTPUT EMI: 01 | CGMS-A : COPY PROHIBIT MACROVISION: APS | CGMS-A : COPY PROHIBIT + APS | SCMS : COPY PROHIBIT | |
| | 11 | 00 | NO ENCIPHER EMI: 00 | SCMS : COPY FREE | CGMS-A: COPY FREE MACROVISION: OFF | CGMS-A : COPY FREE | SCMS : COPY FREE | |
| | | 10 | OUTPUT IMPOSSIBLE | SCMS : COPY ONCE | CGMS-A: COPY FREE MACROVISION: OFF | CGMS-A : COPY ONCE | SCMS : COPY ONCE | |
| | | 01 | OUTPUT IMPOSSIBLE | SCMS: COPY PROHIBIT | CGMS-A : COPY PROHIBIT MACROVISION: APS | CGMS-A : COPY PROHIBIT + APS | SCMS: COPY PROHIBIT | |
| | | 11 | OUTPUT IMPOSSIBLE | SCMS: COPY PROHIBIT | CGMS-A : COPY PROHIBIT MACROVISION: APS | CGMS-A : COPY PROHIBIT + APS | SCMS: COPY PROHIBIT | |
| | 10 OR 00 | 00 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 10 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 01 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | | 11 | OUTPUT IMPOSSIBLE | OUTPUT IMPOSSIBLE | OUTPUT IMPOSSIBLE | OUTPUT IMPOSSIBLE | OUTPUT IMPOSSIBLE | |
| | NO DESCRIPTOR | | NO ENCIPHER EMI: 00 | SCMS : COPY FREE | CGMS-A: COPY FREE MACROVISION: OFF | CGMS-A : COPY FREE | SCMS : COPY FREE | |

▨ : THIS DESIGNATED PORTION SHOWS COMBINATIONS THAT ARE NOT DEFINED BY TRANSMISSION STIPULATIONS, AND ALSO SHOWS SUPPORT OF RECEIVER FOR ERRONEOUS TRANSMISSION (P)

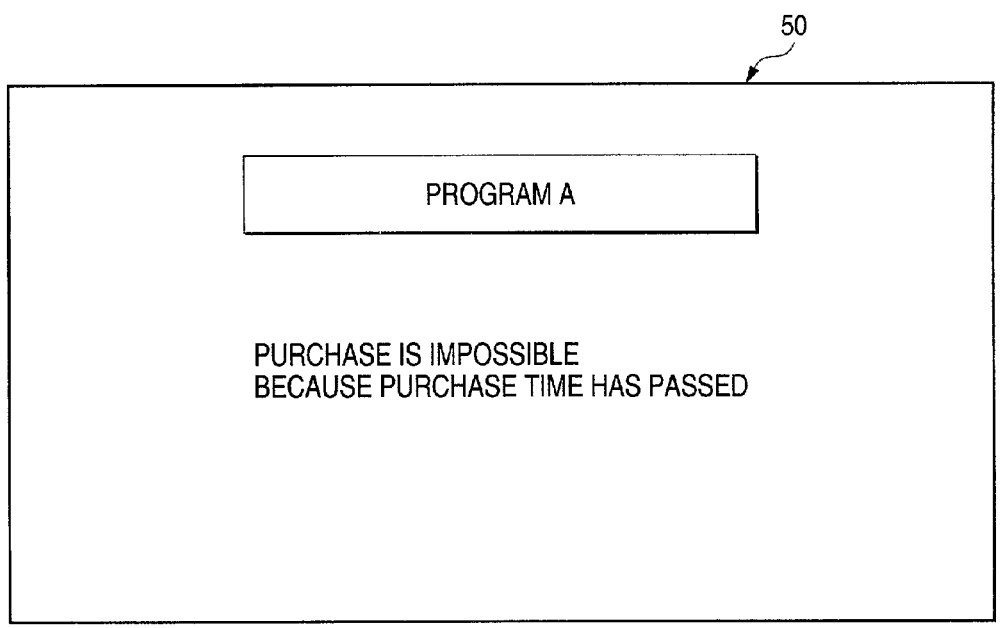
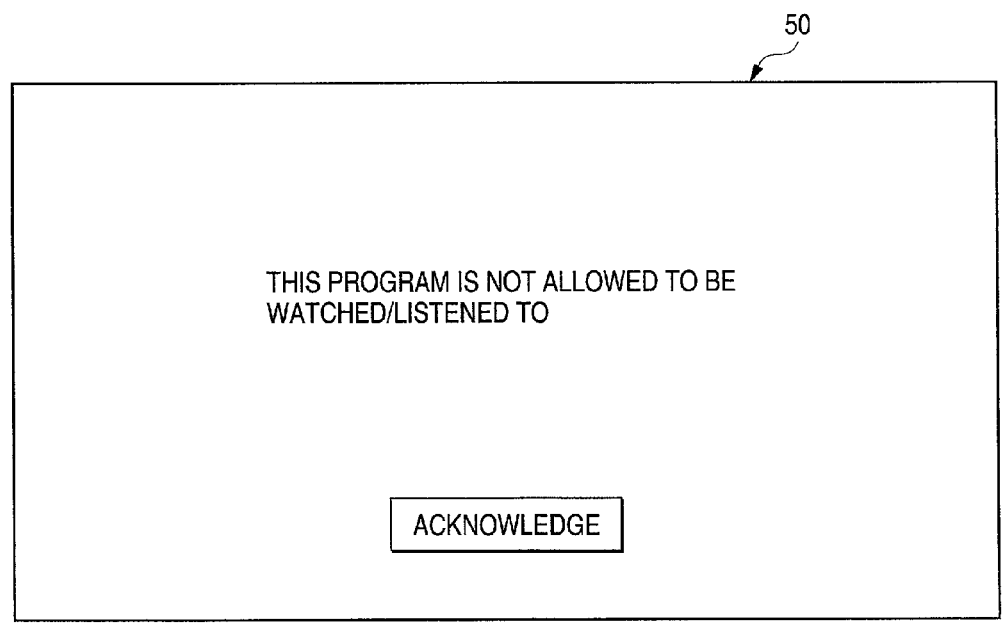

INFORMATION PROCESSING DEVICE AND METHOD, AND RECORDING MEDIUM

CROSS-REFERENCE TO RELATED APPLICATIONS

The present application claims priority from Japanese Application No. P2000-256253 filed on Aug. 25, 2000, the disclosure of which is hereby incorporated by reference herein.

BACKGROUND OF THE INVENTION

The present invention relates to an information processing device and method, and a recording medium, and particularly to an information processing device and method and a recording medium which are suitably applied to a device for providing users with copy-protected data.

Recently, digital broadcasts for distributing video data and audio data as digital data have become popular. A reception device for receiving digital broadcasts is equipped with plural output terminals so that it can connect to various devices. For example, it is equipped with a digital terminal for outputting received digital data to another device, a terminal to which an IEEE1394 cable is connected, a terminal to which an optical cable is connected, etc., and also it is equipped with an analog terminal for outputting received data to an analog-only supporting device.

Three types of digital data are distributed, such as video data and audio data for television receivers, audio data for radio receivers and programs for personal computers or game machines.

Even if the digital data distributed by the digital broadcast are temporarily stored in a recording medium and copied into another recording medium many times, the image quality and the sound quality of the digital data do not deteriorate, and thus plural copies can be created. Such a situation is unfavorable from the viewpoint of copyrights, and thus distributed digital data are subjected to a method of preventing such illegal copies (copy protect).

As described above, there are three types of digital data (contents) to be distributed, and a reception device for receiving digital data is equipped with plural terminals. The copy protect operation is varied in accordance with the types of these contents and the outputting terminals.

FIGS. 1 to 3 include tables showing the copy protect in accordance with the three content types.

FIG. 1 shows a table on the copy protect of digital data for television receivers, FIG. 2 shows a table on the copy protect of digital data for devices for receiving digital audio services such as radio receivers, and FIG. 3 shows a table on the copy protect of digital data for devices for receiving data services of programs, etc., such as personal computers.

As shown in the tables of FIGS. 1 to 3, the specification on the copy protect is given so as to meet the type of content and the output destination. Of course, the user may become frustrated even when the user is directly supplied the information on the copy protect. However, when no information on the copy protect is supplied, the user may nevertheless be unable to record pictures because the copy protect is applied thereto although the user wants to record the pictures. There may occur a situation, therefore, in which the user cannot watch/listen to the pictures although the user paid to watch/listen to them.

SUMMARY OF THE INVENTION

The present invention has an object to collect information on copy protect and easily supply information on the copy protect to users.

An information processing device according to the present invention is characterized by comprising: judging means for judging whether restriction on recording is imposed on a program which a user desires to watch and listen to; analyzing means for analyzing the restriction if it is judged by the judging means that the restriction on recording is imposed on the program; and display control means for controlling a display on a screen to make the user recognize a processing result of the analyzing means.

An information processing method according to the present invention is characterized by comprising: a judging step for judging whether restriction on recording is imposed on a program which a user desires to watch and listen to; an analyzing step for analyzing the restriction if it is judged in the processing of the judging step that the restriction on recording is imposed on the program; and a display control step for controlling a display on a screen to make the user recognize an analysis processing result of the analyzing step.

A program of a recording medium according to the present invention is characterized by including: a judging step for judging whether restriction on recording is imposed on a program which a user desires to watch and listen to; an analyzing step for analyzing the restriction if it is judged in the processing of the judging step that the restriction on recording is imposed on the program; and a display control step for controlling a display on a screen to make the user recognize an analysis processing result of the analyzing step.

In the information processing device, the information processing method and the recording medium according to the present invention, when it is judged that restriction on recording is imposed on the program which the user wants to watch/listen to, the restriction is analyzed, and in a case where the analysis result indicates that analog recording is released by paying an additional fee, a case where the analysis result indicates that analog recording is allowed, but digital recording is not allowed, or a case where neither analog recording nor digital recording is allowed, a display on a screen to make the user recognize the analysis result is controlled in accordance with the respective cases. Accordingly, the information on the restriction on the recording can be easily supplied to the user.

BRIEF DESCRIPTION OF THE DRAWINGS

FIG. 1 is a diagram showing the copy protect protocol for digital TV service;

FIG. 2 is a diagram showing the copy protect protocol for digital audio service;

FIG. 3 is a diagram showing the copy protect protocol for digital data service;

FIG. 7 is a further continuation of the flowchart of

FIG. 8 is a diagram showing a display example displayed on a television receiver;

FIG. 9 is a diagram showing a display example displayed on the television receiver;

DETAILED DESCRIPTION OF THE PREFERRED EMBODIMENTS

Preferred embodiments according to the present invention will be described hereunder with reference to the accompanying drawings.

Figure 4:
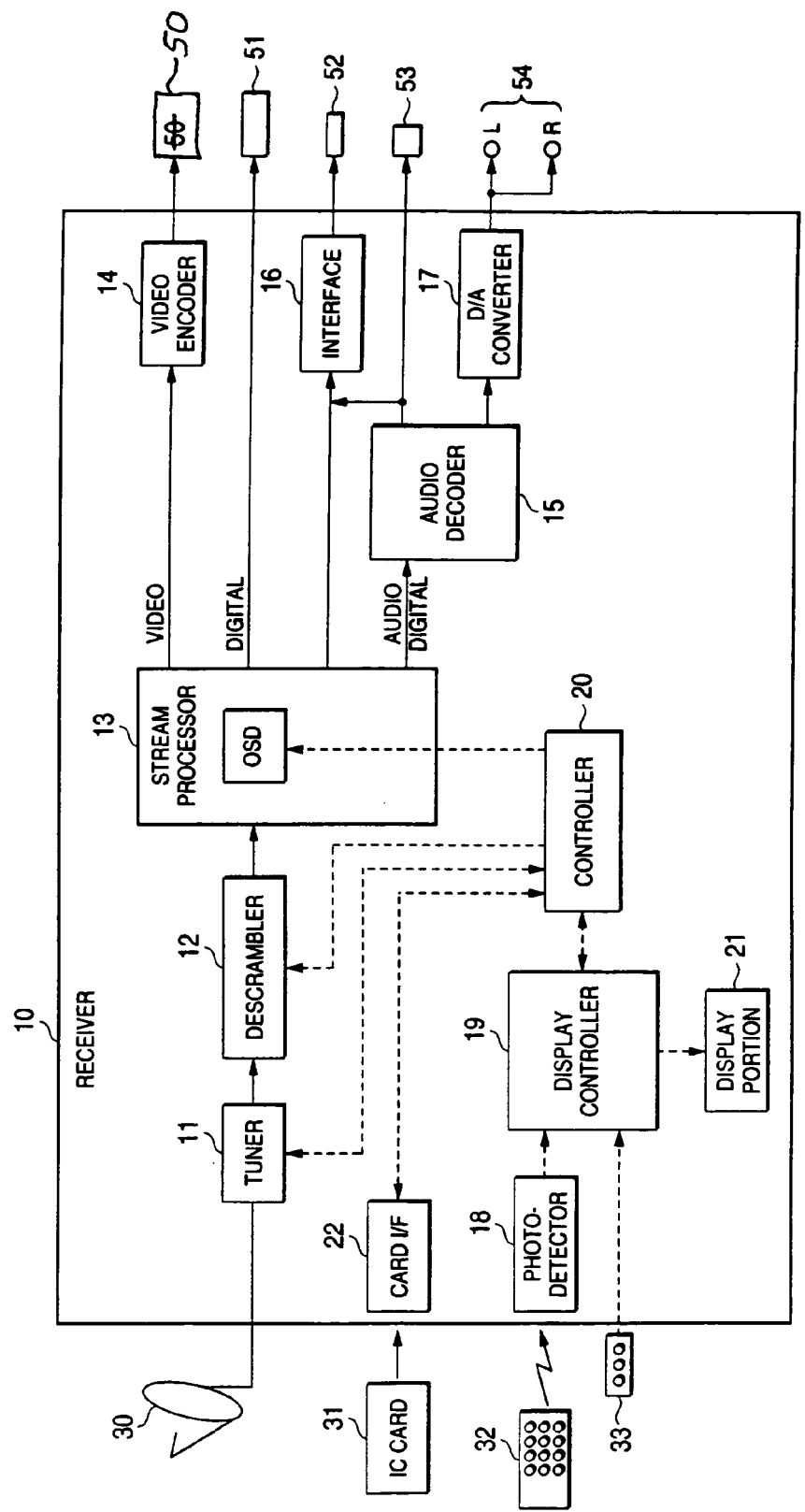
FIG. 4 is a diagram showing an embodiment of a receiver to which the present invention is applied.

FIG. 4 is a diagram showing the construction of an embodiment of a receiver to which the present invention is applied. A receiver 10 is STB (Set Top Box), IRD (Integrated Receiver Decoder) or the like. Digital data received from an antenna 30 are input to a tuner 11 of the receiver 10. The tuner 11 extracts data on a program indicated by a user and outputs the data to a descrambler 12.

When input data are scrambled and when the scramble is allowed to be descrambled (for example, a regular subscription is taken out, and thus a descramble key is kept), the descrambler 12 descrambles the scramble and outputs the data to a stream processor 13. The stream processor 13 outputs video data of the input data to a video encoder 14, and also outputs audio data of the input data to an audio decoder 15. When the video data are encoded data, the stream processor 13 subjects the input video data to the decode processing corresponding to the encode system, further generates OSD (On Screen Display) data if occasion demands, superposes the OSD data on the decoded video data and then outputs the data thus obtained.

When the video encoder 14 outputs input video data to a television receiver 50, the video encoder 14 subjects the input video data to encode processing meeting the television receiver 50, for example, the encode processing based on the NTSC (National Television System Committee) system and then outputs the encoded data to the television receiver 50. The video data processed by the stream processor 13 are also output to a component 51 treating digital data.

The audio decoder 15 subjects the input audio data to the decode processing corresponding to the encode system of the audio data. The audio data which have been subjected to the decode processing by the audio decoder 15 are output to an interface 16. The interface 16 is connected to IEEE1394 cable 52, for example, and outputs the audio data from the audio decoder 15 to a device connected to the IEEE1394 cable 52.

The audio data output from the audio decoder 15 are also output to other devices through an optical cable 53. Further, the audio data output from the audio decoder 15 are converted to analog data by a D/A (Digital/Analog) converter 17, and output to a speaker 54.

The tuner 11 extracts the data of a program indicated by the user. The user tunes a desired program by using a remote controller 32 or switch 33, and outputs an instruction. The switch 33 is provided on the side surface of the receiver 10, and it is designed to output substantially the same instruction as the remote controller 32. The remote controller 32 receives/transmits data from/to the receiver 10 by infrared rays, for example.

The data corresponding to an instruction which the user transmits by using the remote controller 32 are received by a photodetector 18 of the receiver 10. The data received by the photodetector 18 or the data corresponding to the instruction based on the switch 33 are output to a display controller 19. The display controller 19 outputs the data from the photodetector 18, or the data from the switch 33, to a controller 20 if occasion demands, and also controls the display portion 21 according to the input data.

The display portion 21 is provided on the side surface of the receiver 10, and it makes a display to make the user know that the processing corresponding to the user's instruction is executed or makes a display for information to be supplied to the user.

When a subscription for viewing a pay program is taken out, data supplied from a partner with which the subscription is taken out are stored in an IC card 31. This data is a descrambling key for descrambling the scramble or the like. The IC card 31 is mounted in a card I/F (Interface) 22 so that the recorded data are read out. The data thus read out are output to the controller 20.

On the basis of the input data, the controller 20 outputs an indication of a program to be extracted to the tuner 11, and also supplies the descrambling key to the descrambler 12.

Figure 5:
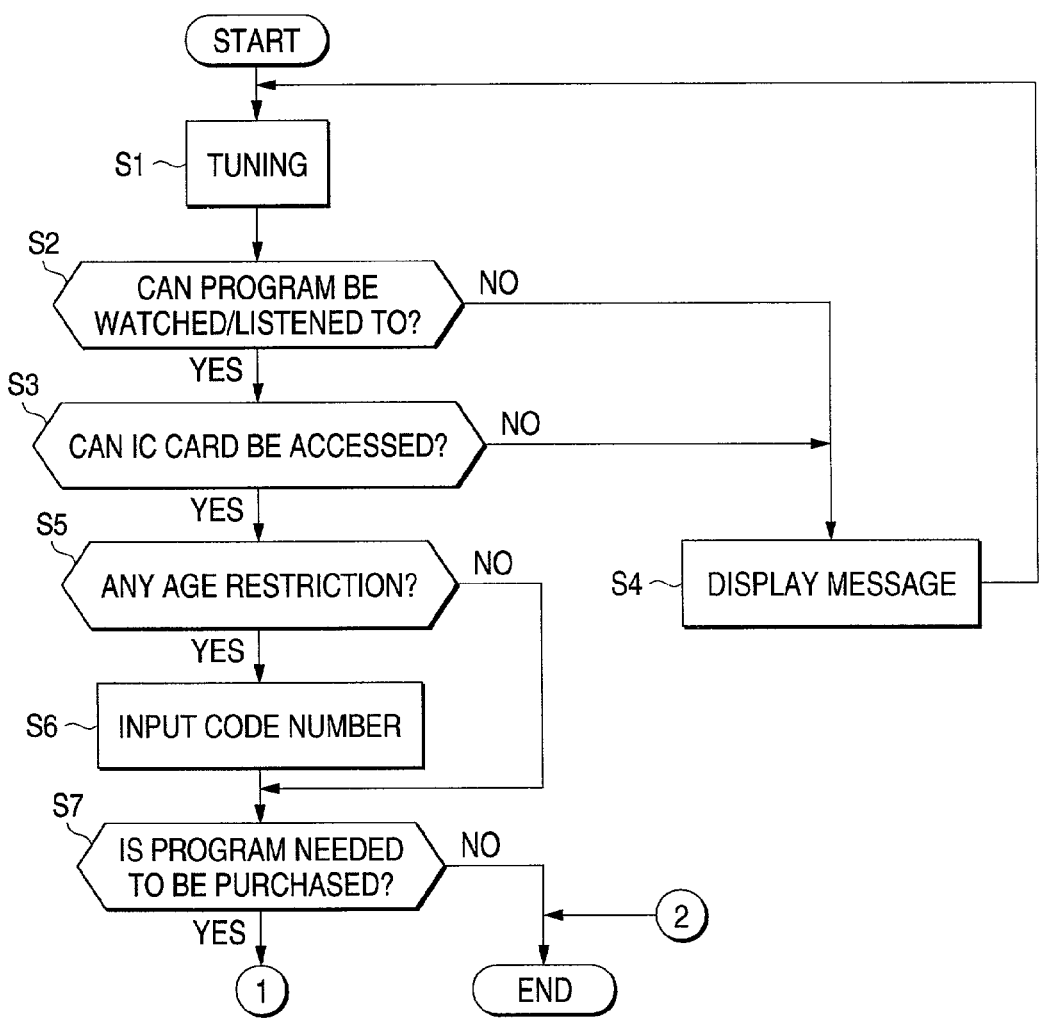
FIG. 5 is a flowchart showing the operation of the receiver of FIG. 4.
Figure 6:
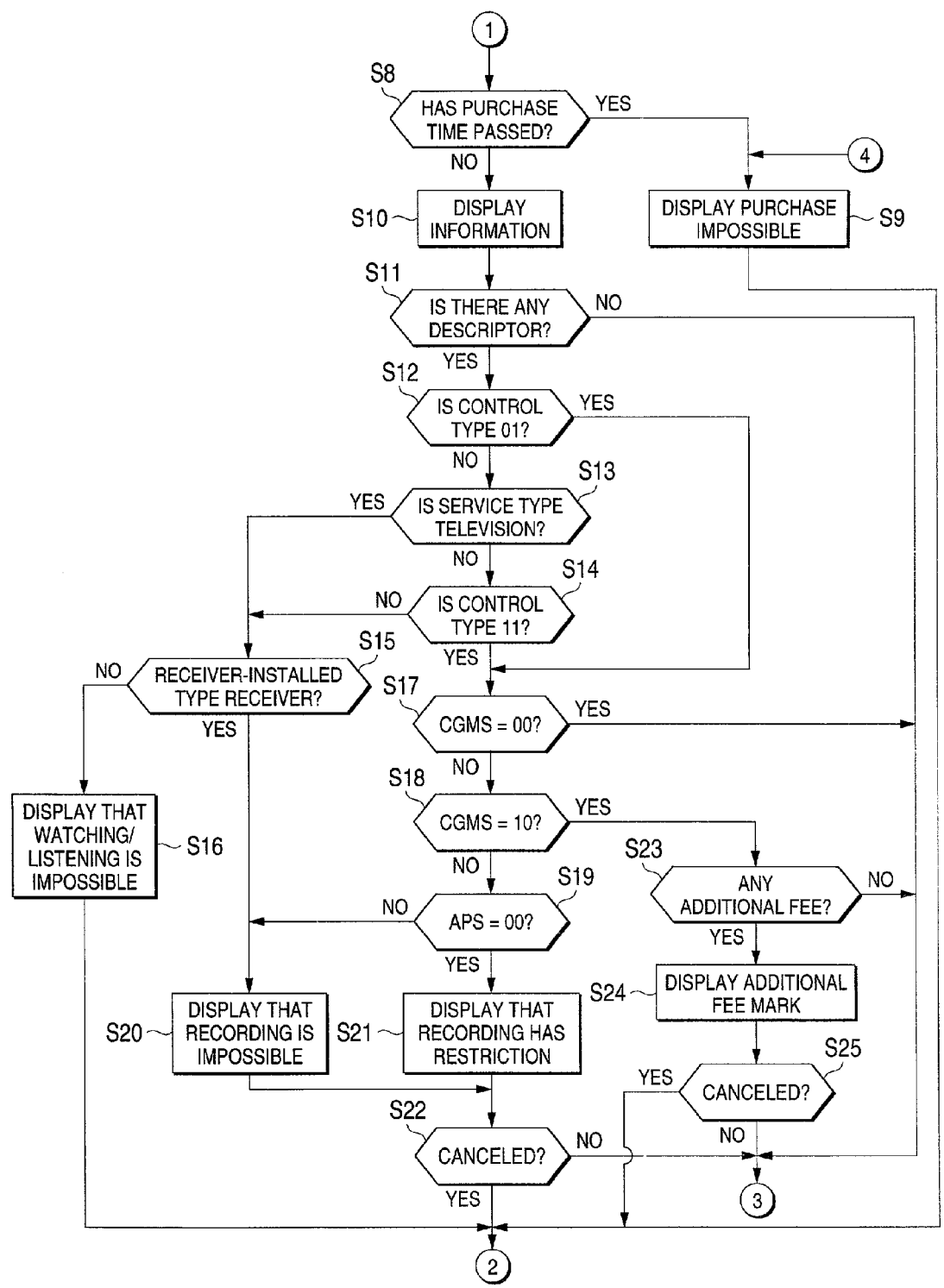
FIG. 6 is a continuation of the flowchart of FIG. 5.

The operation of the receiver 10 when the user tunes a program will be described with reference to the flowcharts of FIGS. 5 to 7. In step S1, the tuning by user is started. The user can select a desired program (channel) by the remote controller 32 or the switch 33. In step S2, it is judged whether the program selected by the user can be watched/listened to.

When it is judged in step S2 that the program can be watched/listened to, the processing goes to step S3 to judge whether the IC card 31 can be accessed or not. If it is judged in step S2 that the program cannot be watched/listened to or if it is judged in step S3 that the IC card 31 cannot be accessed, the processing goes to step S4 in which a message corresponding to each situation is displayed on the television receiver 50.

If it is judged in step S2 that the program selected by the user cannot be watched/listened to, there would be considered such a case that the user does not take out subscription of the program (channel). Accordingly, when the processing goes from step S2 to S4, a message like "You cannot watch/listen to this program on the basis of the subscription condition" or the like is displayed.

If it is judged in step S3 that the IC card 31 cannot be accessed, there may be considered such a case that the IC card 31 is not set in the card I/F 22 or a different IC card 31 is set. If it is judged that the IC card 31 is not set in the card I/F 22, a message like "Please insert card" or the like is displayed in step S4. If it is judged that a different IC card 31 is set in the card I/F 22, a message like "Access to card is not established" or the like is displayed in step S4.

When such a message as described above is displayed, the user may open the lid of the card I/F 22 in order to set the IC card 31. When the lid of the card I/F 22 is opened, the message displayed on the screen of the television receiver 50 is switched to a message like "Please close the lid" or the like. When the display of the message in step S4 is finished, the processing returns to step S1 to repeat the processing of the step 1 and the subsequent steps for a new tuning operation.

On the other hand, if it is judged in step S3 that the IC card 31 can be accessed, the processing goes to step S5 to judge whether a selected program has a restriction on the age for watching or listening to the program. If it is judged that the program has an age restriction, the display is switched to a frame for input of a code number in step S6, and the program is set to a code-number input standby state.

If a code number is accurately input in step S6, the processing goes to step S7. If in step S6 the code number is not accurately input, the processing does not go to the step S7, and no subsequent processing is carried out.

On the other hand, if it is judged in step S5 that no age restriction is imposed, the processing of step S6 is skipped, and the processing goes to step S7. It is judged in step S7 whether the selected program is a program to be purchased or not. A program for which it is judged unnecessary to purchase is a charge-free broadcast program or a program for which it is judged that a subscription for the program was taken out in advance.

If it is judged in step S7 that the program selected by the user is a program which need not be purchased, in other words, the program can be watched/listened to, the tuning processing is finished and the screen of the television receiver 50 is switched to display the program selected. On the other hand, if it is judged in step S7 that the program selected by the user is a program which must be purchased, the processing goes to step S8 (FIG. 6).

It is judged in step S8 whether the time for purchasing the program selected by the user has expired. For example, if the broadcast time for the program selected by the user has terminated, it is judged that the purchase time has passed. If it is judged in step S8 that the purchase time for the program has passed, the processing goes to step S9.

In step S9, for example, a message to make the user recognize that the purchase is impossible as shown in FIG. 8 is displayed on the screen of the television receiver 50. When such a message is displayed for a predetermined time, or by a predetermined user's operation, the screen is switched to a channel at which the user watched/listened to before the start of the tuning processing.

On the other hand, if it is judged in step S8 that the purchase time has not passed, the processing goes to step S10 in which information on the program selected by the user, for example, a program title, a start time, an end time, a charge amount, or the content of the program is displayed on the screen of the television receiver 50. In addition to the above display, it is judged in step S11 whether the program selected by the user has a digital copy control descriptor or not. An example of the digital copy control descriptor is shown below.

```
digital_copy_control_descriptor ( ) {
descriptor_tag 8 uimsbf
descriptor_length 8 uimsbf
digital_recording_control_data 2 bslbf
maximum_bit_rate_flag 1 bslbf
component_control_flag 1 bslbf
copy_control_type 2 bslbf
if(copy_control_type==0||copy_control_type==11)){
   APS_control_data 2 bslbf
}else{
reserved_future_use 2 bslbf
}
if(maximum_bit_rate_flag==1) {
   maximum_bit_rate 8 uimsbf
}
if(component_control_flag==1){
   component_control_length 8 uimsbf
   for (j=0; j<N; J++){
      component_tag 8 uimsbf
      digital_recording_control_data 2 bslbf
      maximum_bitrate_flag 1 bslbf
      reserved_future_use 1 bslbf
   copy_control_type 2 bslbf
   if(copy_control_type==01||copy_control_type==11){
   APS_control_data 2 bslbf
      }else{
      reserved_future_use 2 bslbf
   }
   if(maximum_bitrate_flag==1){
      maximum_bitrate 8 uimsbf
      }
      }
   }
}
}
```

The processing of the step S12 and the subsequent steps is carried out according to the content described in such a descriptor. It is judged in step S12 whether the copy control type is equal to 01 or not. If the copy control type is equal to 01, some restriction exists on copying the program as is apparent from FIG. 1 to FIG. 3. If it is judged in step S12 that the copy control type is not equal to 01, the processing goes to step S13.

It is judged in step S13 whether a service type is television, in other words, whether video data and audio data are supplied. In FIGS. 1 to 3, when a digital TV service shown in FIG. 1 is provided as a content type, it corresponds to the judgment that the service type is the television in step S13. When the processing goes to step S13, this is the case where the copy control type is judged to be equal to 11, 10 or 00.

As is apparent from FIG. 1, when the copy control type is equal to 11, 10 or 00 for data to be supplied to the television receiver, output impossibility is set for all the data. On the other hand, as is apparent from FIG. 2 and FIG. 3, in a case where the content type is a digital audio service (a service to be supplied to a radio or the like) or a data service (a service to be supplied to a personal computer or the like), restriction is imposed on the copy when the copy control type is equal to 11, and the output is impossible when the copy control type is equal to 10, 00, that is, this case is different from the case where the data are supplied to the television receiver.

Therefore, it is judged in step S13 whether the service type is the television or not, and it is judged in step S14 whether the copy control type is equal to 11. If it is judged in step S13 that the service type is the television, or it is judged in step S14 that the copy control type is not equal to 11, the processing goes to step S15. In step S15, it is judged whether the receiver 10 is installed in the television receiver 50 (that is, the built-in type).

Here, in FIGS. 1 to 3, the output impossibility shows that it is impossible to output the data received by the receiver 10 to another device which is externally connected to the receiver 10 through a cable or the like. Accordingly, in the case of the built-in type, the data received can be processed in the device in which the receiver 10 is installed.

Further, if it is judged in step S13 that the service type is not television and it is judged in step S14 that the control type is not equal to 11, the processing goes to step S15 to judge whether television receiver 50 is of the type in which the receiver 10 is installed. The above processing procedure is carried out because only sounds can be supplied from the television receiver 50 to a user when the service type is not television, for example when the service type is radio.

If it is judged in step S15 that the receiver 10 is not a built-in receiver, in other words, if it is judged that the receiver 10 and the television receiver 50 are connected to each other with an external terminal through a cable or the like, the processing goes to step S16 in which a message to make the user recognize that the program is a program which the user cannot watch/listen to as shown in FIG. 9 is displayed on the screen of the television receiver 50.

When an "acknowledge" button is operated on the screen as shown in FIG. 9, the screen is switched to a normal display frame (for example, a display frame before tuning).

If it is judged in step S12 that the copy control type is equal to 01, or it is judged in step S14 that the control type is equal to 11, the processing goes to step S17. The case where the control type is equal to 01 and the case where the control type is equal to 11 show that some restriction is imposed on copying the program.

It is judged in step S17 whether CGMS (digital recording control data) is equal to 00. As is apparent from FIG. 1 to FIG. 3, four flags of 00, 10, 01 and 11 are used for the digital recording control data (CGMS) for designating all the various control types. When CGMS is equal to 00, it shows that copying is allowed.

If it is judged in step S17 that CGMS is not equal to 00, the processing goes to step S18 to judge if CGMS is equal to 10. If CGMS is equal to 10, it shows that only one copy is allowed. If it is judged in step S18 that CGMS is not equal to 10, the processing goes to step S19 to judge whether APS (Analog Protection System) is equal to 00.

Figure 10:
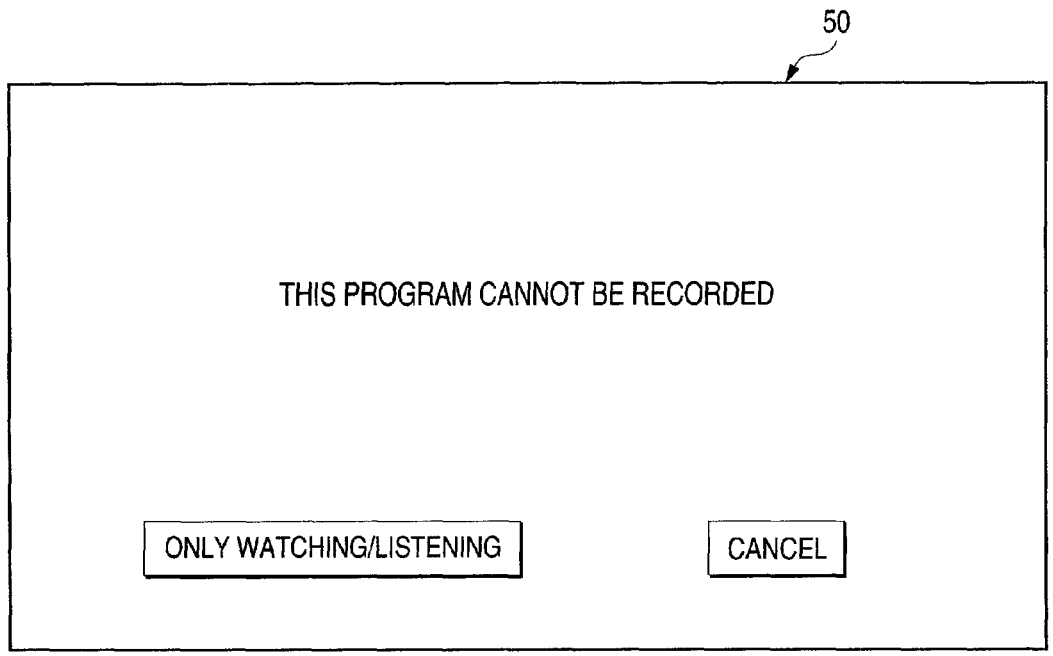
FIG. 10 is a diagram showing a display example displayed on the television receiver.

If it is judged in step S19 that APS is not equal to 00, the processing goes to step S20. If it is judged that APS is equal to 00, the processing goes to step S21. In step S20, a message to make the user recognize that recording is not allowed irrespective of analog or digital recording as shown in FIG. 10 is displayed on the screen. The processing also goes to step S20 when it is judged in step S15 that the receiver is the television receiver 50 in which the receiver 10 is installed.

Figure 11:
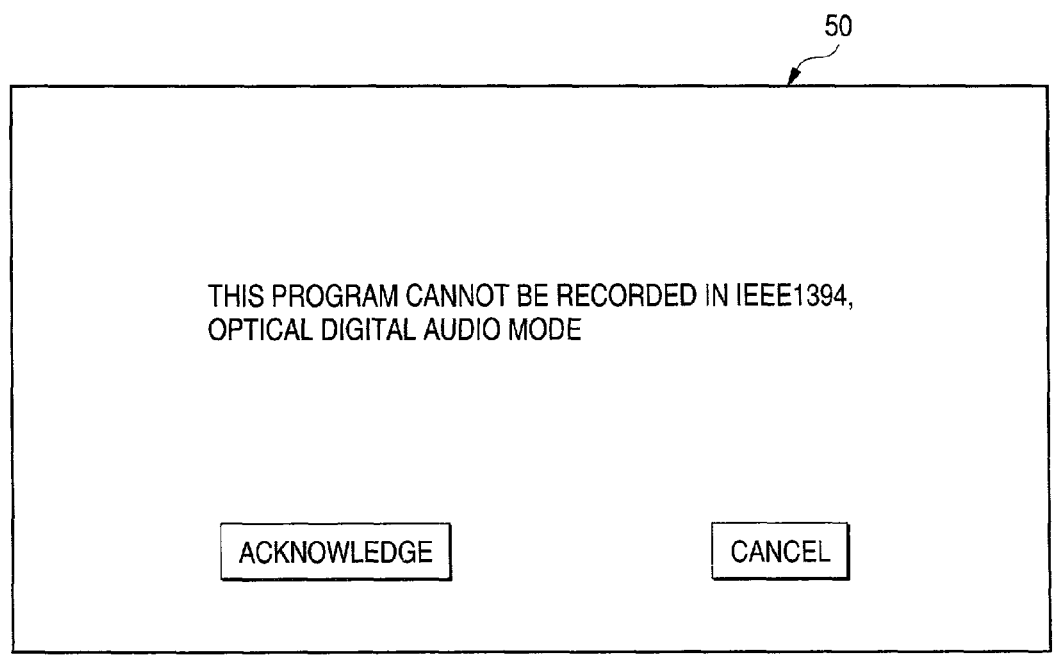
FIG. 11 is a diagram showing a display example displayed on the television receiver.

In step S21, a display frame as shown in FIG. 11 is displayed on the television receiver 50. When such a display frame is displayed, it shows that copying is allowed if it is analog. When the processing of step S20 or step S21 is finished, the processing goes to step S22, and in step S22 it is judged whether a "cancel" button in the display frame shown in FIG. 10 or FIG. 11 is operated. If it is judged in step S22 that the "cancel" button is operated, the tuning processing is finished.

Figure 7:
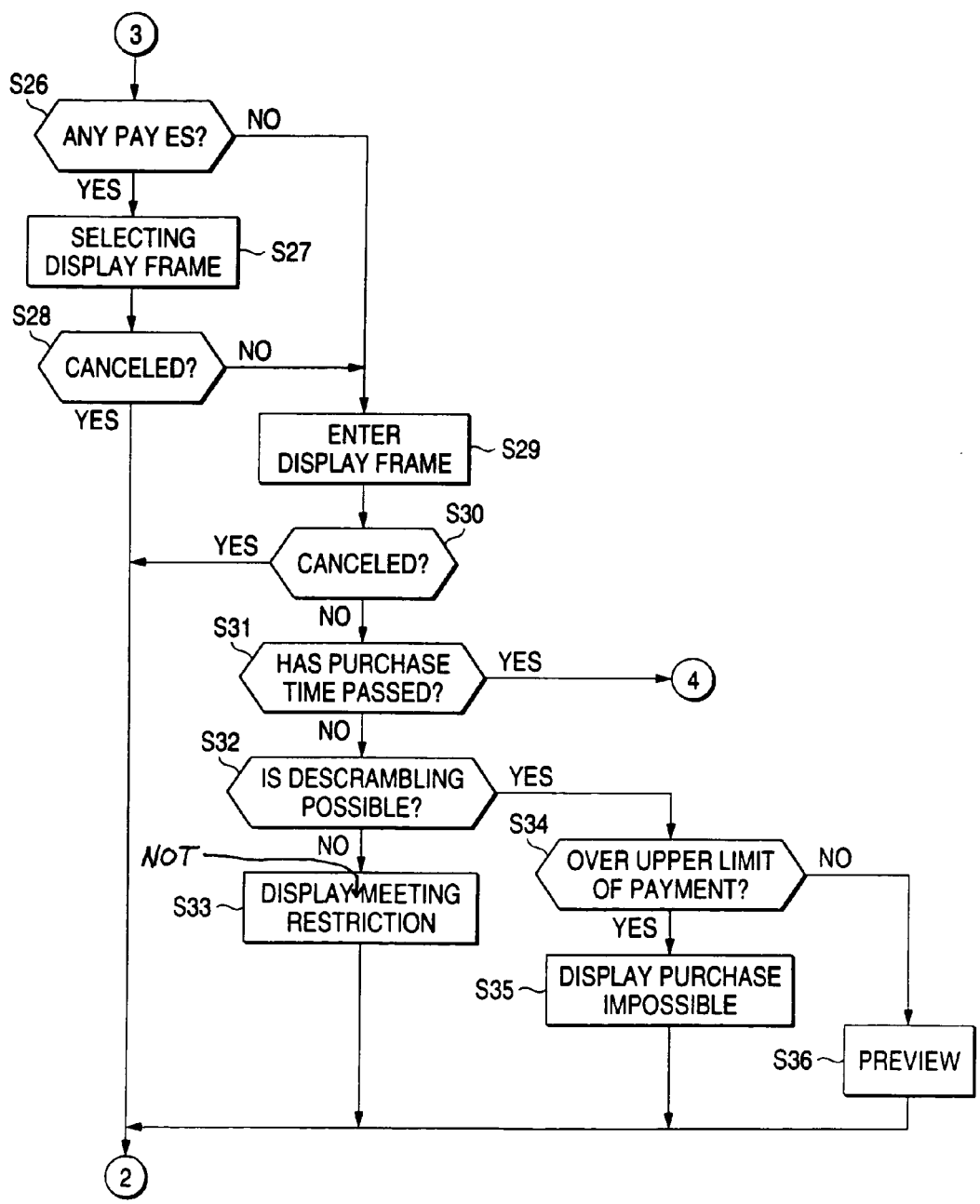

If it is judged in step S22 that the "cancel" button is not operated, in other words, if a "only watching/listening" button is operated on the display frame shown in FIG. 10 displayed in step S20, or an "acknowledge" button is operated on the display frame shown as shown in FIG. 11 displayed in the step S21, the processing goes to step S26 (FIG. 7).

On the other hand, if it is judged in step S18 that CGMS is equal to 10, the processing goes to step S23 to judge whether an additional fee is needed. If it is judged that CGMS is equal to 10, as is apparent from FIG. 1 to FIG. 3, copying is allowed. It is judged in step S23 whether an additional fee is needed for copying (recording), particularly whether an additional fee is needed to analog copy. If it is judged in step S23 that no additional fee is needed, the processing goes to step S26 (FIG. 7). The processing also goes to step S26 if it is judged in step S17 that CGMS is equal to 00 (when it is judged that copying is free).

Figure 12:
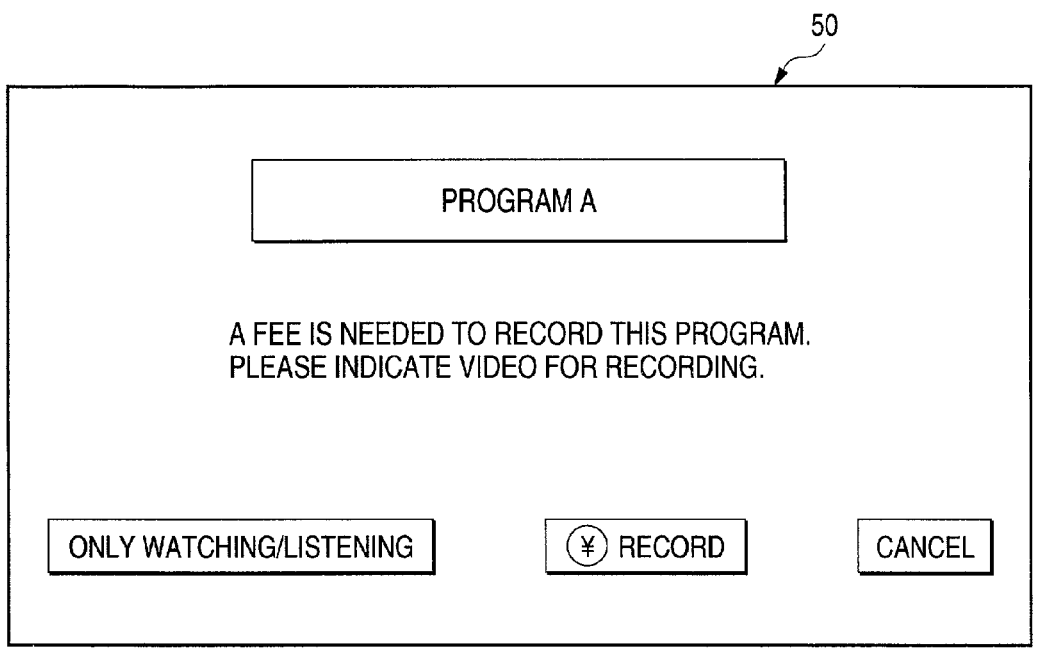
FIG. 12 is a diagram showing a display example displayed on the television receiver.

On the other hand, if it is judged in step S23 that an additional fee is needed, the processing goes to step S24 to display to the user that an additional fee is needed for recording, as shown in FIG. 12 (in the example of FIG. 12, a yen mark (¥) is displayed on a "recording" button). As shown in FIG. 12, the additional fee for recording is displayed.

On the display frame as shown in FIG. 12, it is judged in step S25 whether the user operates the "cancel" button. If it is judged in step S25 that the "cancel" button is operated, the processing of the tuning is finished. If it is judged in step S25 that the "cancel" button is not operated, in other words, if it is judged that the "only watching/listening" button or the "recording" button is operated, the processing goes to step S26.

Figure 13:
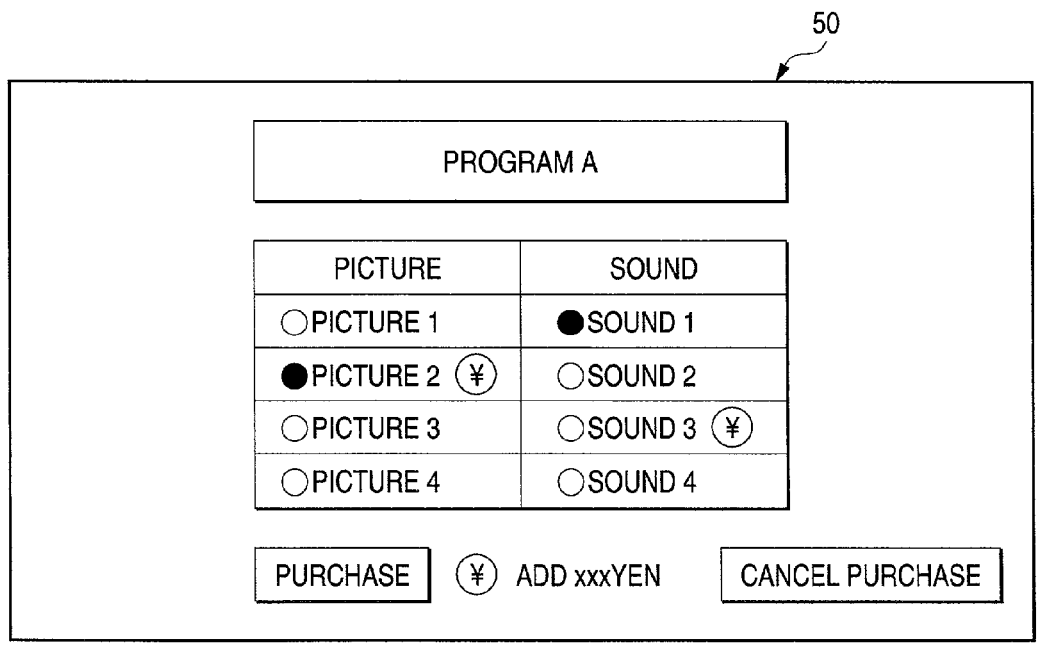
FIG. 13 is a diagram showing a display example displayed on the television receiver.

It is judged in step S26 whether there is any pay ES (Elementary Stream). If it is judged in step S26 that there is a pay ES, the processing goes to step S27 to display a selection frame as shown in FIG. 13 on the television receiver 50. In the display example shown in FIG. 13, it is apparent that four kinds of pictures and voices are distributed for a program A. For example, a standard screen size, and a wide vision size are provided as the picture types, and Japanese, English, etc. are provided as the voice types.

A yen mark showing that an additional fee is needed is displayed for the picture 2 and the voice 3 in the four kinds of pictures and voices. A selected ES is represented by a black dot and a non-selected ES is represented by an open circle.

A "purchase" button and a "purchase cancel" button are provided in the lower portion of the screen. When selected ESs need additional fees, the total amount of the additional fees is displayed between these buttons. The user selects a desired ES using such a display frame, and operates the "purchase" or "purchase cancel" buttons.

Figure 14:
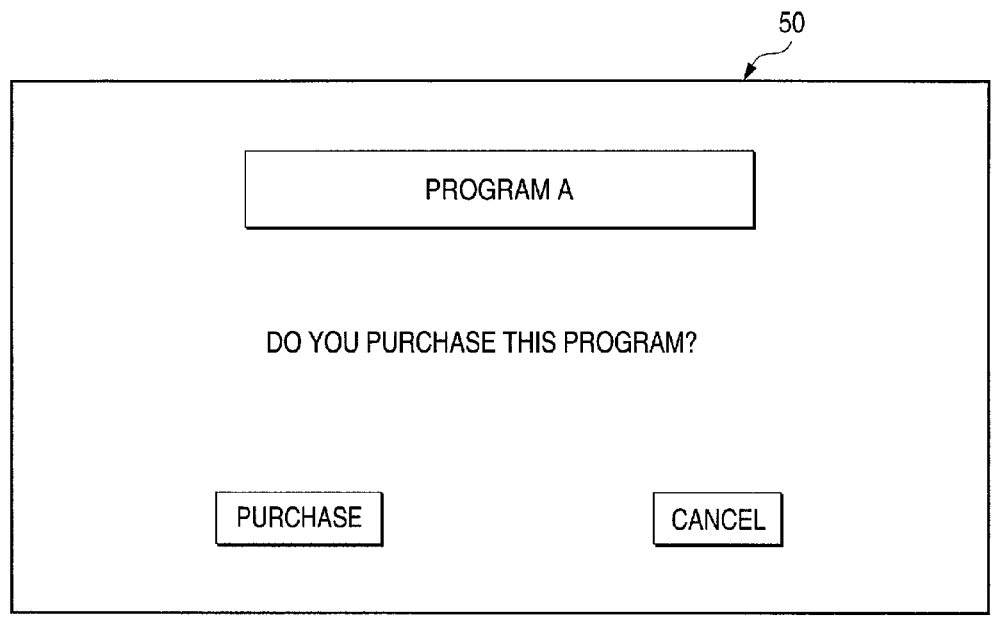
FIG. 14 is a diagram showing a display example displayed on the television receiver.

It is judged in step S28 whether the "purchase cancel" button is operated or not. If it is judged that the "purchase cancel" button is operated, the tuning processing is finished. If it is judged that the "purchase cancel" button is not operated, in other words, if it is judged that the "purchase" button is operated, the processing goes to step S29 and an enter display frame as shown in FIG. 14 is displayed. The enter display frame is a display frame to make the user finally acknowledge whether the selected program should be actually purchased on the basis of the selected content.

It is judged in step S30 from the display frame shown in FIG. 14 whether the user operates the "cancel" button or not. If it is judged that the "cancel" button is operated, the tuning processing is finished. On the other hand, if it is judged in step S30 that the "cancel" button is not operated, in the other words, if it is judged that the "purchase" button is operated, the processing goes to step S31 to judge whether the purchase time has passed or not.

It is also judged in step S8 (FIG. 6) whether the purchase time has passed. However, since there may be considered such a case that the purchase time has passed during execution of the processing of the step S8 and the subsequent steps, the processing of the step S31 is provided. If it is judged in step S31 that the purchase time of a program which the user decides to purchase has passed, the processing returns to step S9 (FIG. 6), and such a display frame as shown in FIG. 8 is displayed, and the tuning processing is finished.

On the other hand, if it is judged in step S31 that the program which the user decides to purchase is within the purchase time, the processing goes to step S32 to judge whether descrambling can be performed. If it is judged in step S32 that descrambling cannot be performed, for example, because of some restriction, a display to make the user recognize this fact is provided in step S33. In step S33, such a display frame as shown in FIG. 15 or FIG. 16 is displayed on the television receiver 50.

Figure 15:
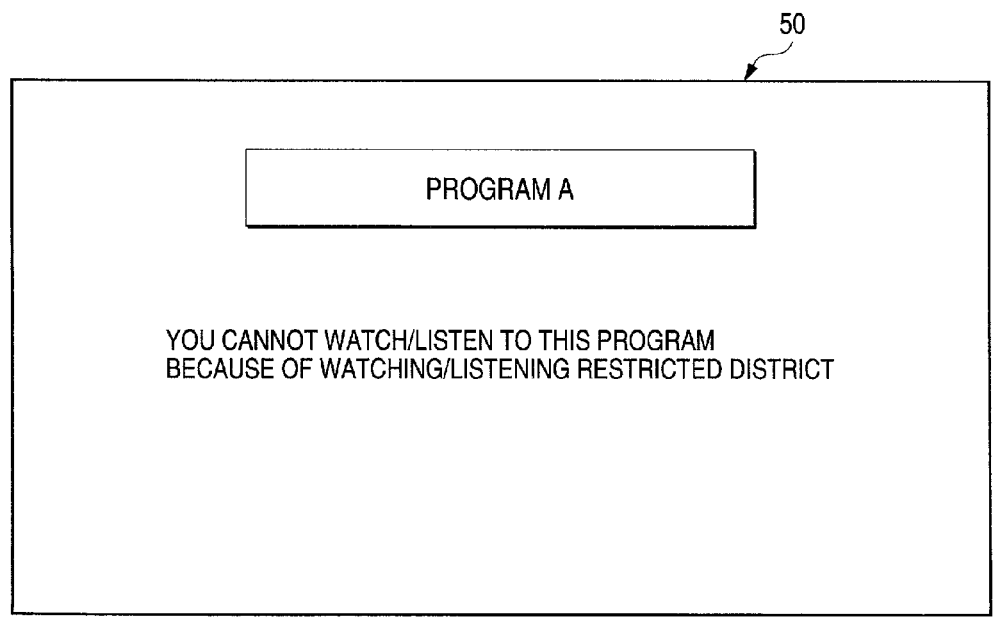
FIG. 15 is a diagram showing a display example displayed on the television receiver.
Figure 16:
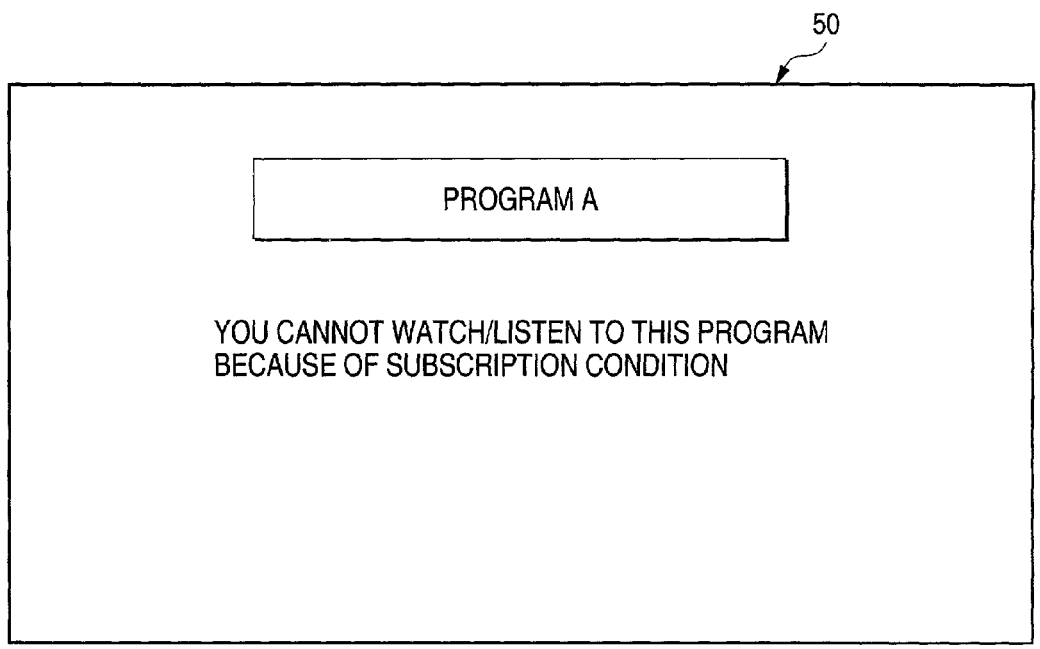
FIG. 16 is a diagram showing a display example displayed on the television receiver.

In the display example shown in FIG. 15, the program which the user decides to purchase is a program having a restriction to a watching/listening district, and it is a display frame when the user does not live in the district in which watching/listening is permitted. The display example of FIG. 16 is a display frame displayed when the watching/listening (purchasing) is not allowed under a subscription condition such as where the program which the user decides to purchase belongs to a channel to which the user does not subscribe, the program is a program for which the user does not subscribe, or the like. When such a display frame is displayed, the tuning processing is finished.

On the other hand, if it is judged in step S32 that the program which the user decides to purchase can be descrambled, the processing goes to step S34 to judge whether the program exceeds the upper limit of the payment based on a card. The card means a credit card with which the user made a contract to pay a fee in advance when the user watches/listens to pay broadcast or an IC card 31 (FIG. 4) in which an amount of money is written in advance, for example. It is judged in step S34 whether the program exceeds the upper limit of the payment of the card, and if it is judged that the program exceeds the upper limit of the payment, the processing goes to step S35.

Figure 17:
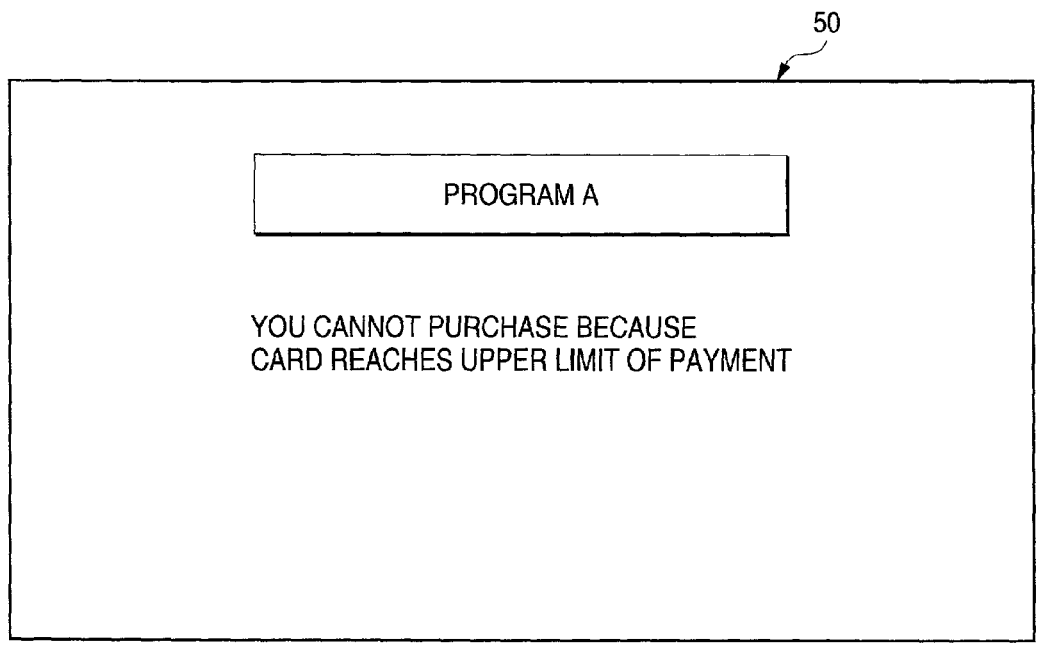
FIG. 17 is a diagram showing a display example displayed on the television receiver.
Figure 18:
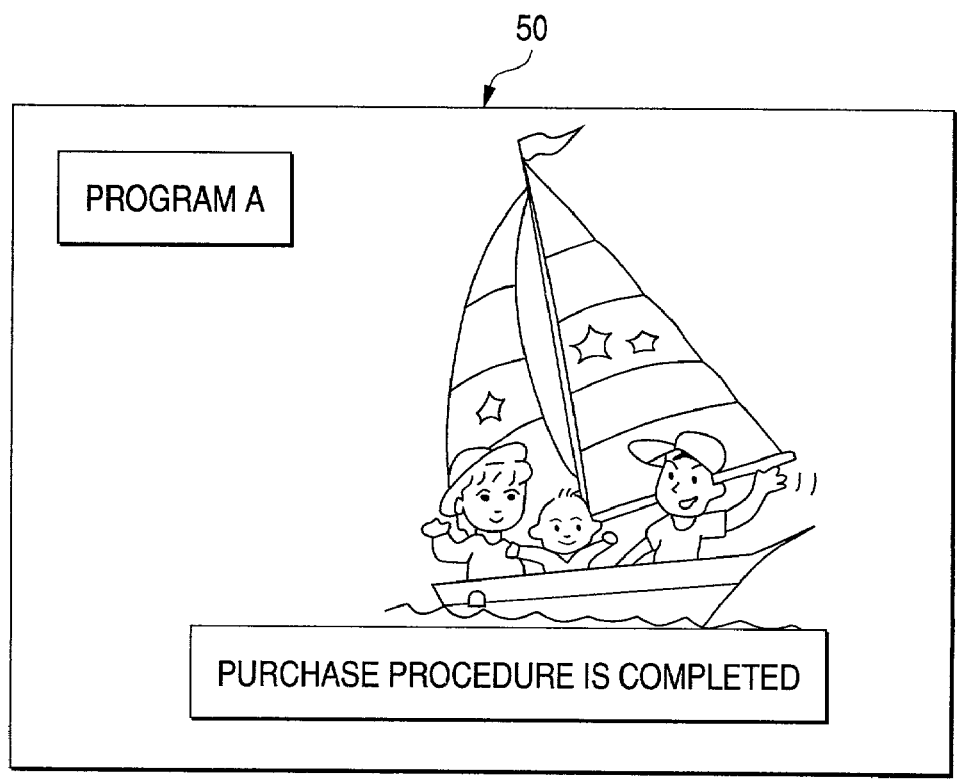
FIG. 18 is a diagram showing a display example displayed on the television receiver.

In step S35, a message is displayed on the television receiver 50 to the user that the program which he or she wishes to purchase cannot be purchased because the program's cost exceeds the upper limit of the user's payment card as shown in FIG. 17, and the tuning processing is finished. On the other hand, if it is judged in step S34 that the program does not exceed the upper limit of the payment card, the processing goes to step S36, and a preview of the purchased program is displayed for only a predetermined time (for example, 3 seconds) as shown in FIG. 18. Further, a message indicating that the procedure for the purchase has been completed is also displayed.

The program desired by the user is selected as described above. As described above, the copy protect is determined in accordance with the service type and the device which is the output destination of the received data. Therefore, according to the above processing, the user can easily purchase a desired program without suffering cumbersome complicated stipulations on the copy protect, and also the user does not suffer the disadvantage of being unable to make a recording because of the application of copy-protect and thus be able to only watch/listen to a program after the user purchases the program.

In other words, with respect to the copy protect, the processing on the copy protect can be finished at the user side by carrying out only one operation on one displayed frame of the four display frames of FIG. 9 to FIG. 12, so that the purchase of programs can be easily carried out.

A series of processing steps as described above can be implemented using hardware or software. When the series of processing steps is implemented using software, the program constituting the software is installed from a recording medium into a special-purpose computer or a general purpose computer which can perform various functions by installing various programs therein.

Figure 19:
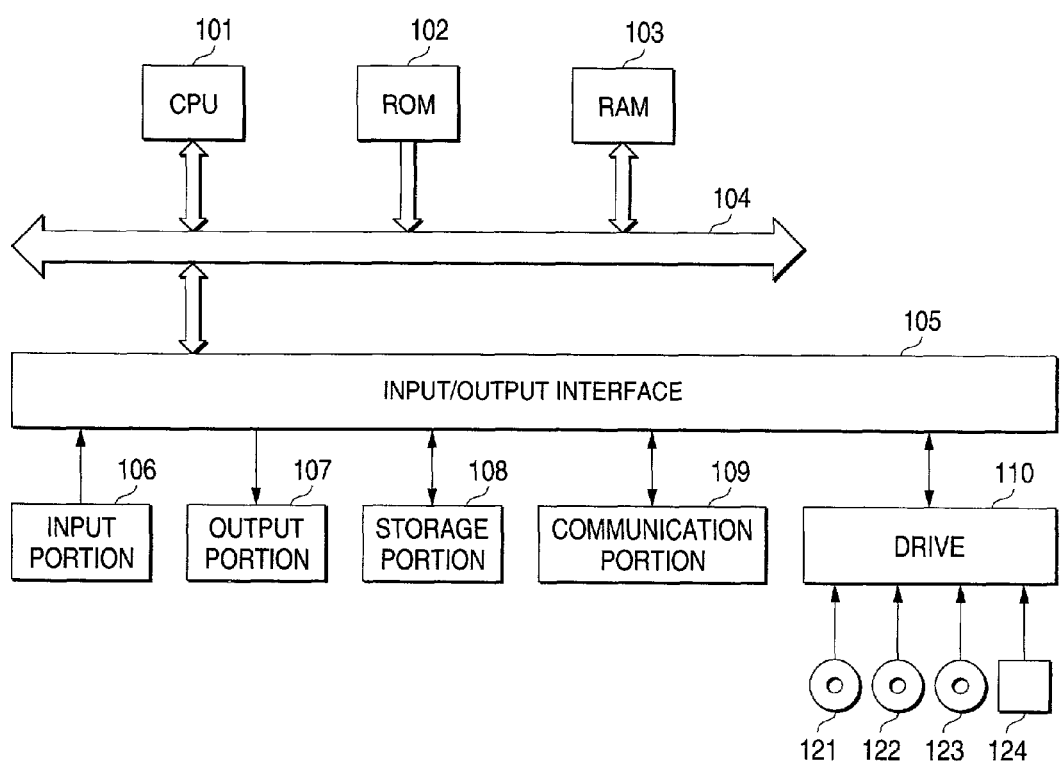
FIG. 19 is a diagram showing a recording medium.

As shown in FIG. 19, this recording medium can be constructed not only as a package medium comprising a magnetic disc 121 (containing a floppy disk), an optical disc 122 (containing CD-ROM (Compact Disc-Read Only Memory)), DVD (Digital Versatile Disk)), a magnetooptical disc 123 (containing MD (Mini-Disk)), a semiconductor memory 124 or the like that has the program recorded therein and is distributed to supply the program to users separately from a computer, but also as a hard disc containing ROM 102 or a storage portion 108 that has the program recorded therein and is supplied to users under the state that it is installed in a computer in advance.

In this specification, the step describing the program to be supplied through the medium contains not only the processing that is carried out in a sequential series according to the described order, but also the processing that is not carried out in this order, but in parallel to, or independent of this processing.

In this specification, the system represents the overall device constructed by plural devices.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An information processing device, characterized by comprising a processor for implementing:
   judging means for judging whether restriction on recording is imposed on a program which a user desires to watch and/or listen to;
   analyzing means for analyzing the restriction if it is judged by said judging means that the restriction on recording is imposed on the program; and
   display control means for controlling a display to display on a screen a message concerning an analysis result of said analyzing means,
   said analyzing is based on whether the type of content included in the program is digital television content, digital audio content, or digital data content, and said analyzing is further based on the format of the content included in the program, each possible format of the content being cross-referenced to a plurality of copy control types and a plurality of digital recording control data, such that for each of digital television content, digital audio content, and digital data content there are at least three formats and each format of each type of content is cross-referenced to a plurality of copy control types and a plurality of digital recording control data,
   for each copy control type there are a plurality of digital recording control data flags, at least one combination of copy control data and digital recording control data flag being associated with at least two copy management systems such that the copy management systems are applied to respective content formats.

2. The information processing device as claimed in claim 1, wherein in accordance with each of a case where said analyzing means determines that analog recording is released by paying an additional fee, a case where said analyzing means determines that analog recording is allowed, but digital recording is not allowed and a case where said analyzing means determines that neither analog recording nor digital recording is allowed, said display control means controls the display on the screen to make the user recognize the respective cases.

3. The information processing device as claimed in claim 1, wherein said display control means controls the display so that the analysis result is displayed on the screen for a predetermined time.

4. An information processing method, characterized by comprising using a processor to perform:
   a judging step for judging whether restriction on recording is imposed on a program which a user desires to watch and/or listen to;
   an analyzing step for analyzing the restriction if it is judged in the processing of said judging step that the restriction on recording is imposed on the program; and a display control step for controlling a display to display on a screen a message concerning an analysis result of said analyzing step, said analyzing is based on whether the type of content included in the program is digital television content, digital audio content, or digital data content, and said analyzing is further based on the format of the content included in the program, each possible format of the content being cross-referenced to a plurality of copy control types and a plurality of digital recording control data, such that for each of digital television content, digital audio content, and digital data content there are at least three formats and each format of each type of content is cross-referenced to a plurality of copy control types and a plurality of digital recording control data, for each copy control type there are a plurality of digital recording control data flags, at least one combination of copy control data and digital recording control data flag being associated with at least two copy management systems such that the copy management systems are applied to respective content formats.

5. The information processing method as claimed in claim 4, wherein in accordance with each of a case where the processing of said analyzing step determines that analog recording is released by paying an additional fee, a case where the processing of said analyzing step determines that analog recording is allowed, but digital recording is not allowed and a case where the processing of said analyzing step determines that neither analog recording nor digital recording is allowed, said display control step controls the display on the screen to make the user recognize the respective cases.

6. The information processing device as claimed in claim 4, wherein said display control step controls the display so that the processing result is displayed on the screen for a predetermined time.

7. A non-transitory computer-readable medium storing a computer-readable program, the program being operable to perform an information processing method including:

a judging step for judging whether restriction on recording is imposed on a program which a user desires to watch and/or listen to;

an analyzing step for analyzing the restriction if it is judged in the processing of said judging step that the restriction on recording is imposed on the program; and a display control step for controlling a display to display on a screen a message concerning an analysis result of said analyzing step, said analyzing is based on whether the type of content included in the program is digital television content, digital audio content, or digital data content, and said analyzing is further based on the format of the content included in the program, each possible format of the content being cross-referenced to a plurality of copy control types and a plurality of digital recording control data, such that for each of digital television content, digital audio content, and digital data content there are at least three formats and each format of each type of content is cross-referenced to a plurality of copy control types and a plurality of digital recording control data, for each copy control type there are a plurality of digital recording control data flags, at least one combination of copy control data and digital recording control data flag being associated with at least two copy management systems such that the copy management systems are applied to respective content formats.

8. The computer-readable medium as claimed in claim 7, wherein in accordance with each of a case where the processing of said analyzing step determines that analog recording is released by paying an additional fee, a case where the processing of said analyzing step determines that analog recording is allowed, but digital recording is not allowed and a case where the processing of said analyzing step determines that neither analog recording nor digital recording is allowed, said display control step controls the display on the screen to make the user recognize the respective cases.

9. The computer-readable medium as claimed in claim 7, wherein said display control step controls the display so that the processing result is displayed on the screen for a predetermined time.

10. A system for providing a person seeking to use or view a program copy protect information regarding the program, said system comprising:

a display; and a processor adapted to execute instructions, said instructions including instructions for causing said processor to perform the steps of identifying the presence of copy protect data within said program, analyzing said copy protect data to determine the type of said copy protect data and controlling said display to display on a screen a message concerning an analysis result of said analyzing, said analyzing is based on whether the type of content included in the program is digital television content, digital audio content, or digital data content, and said analyzing is further based on the format of the content included in the program, each possible format of the content being cross-referenced to a plurality of copy control types and a plurality of digital recording control data, such that for each of digital television content, digital audio content, and digital data content there are at least three formats and each format of each type of content is cross-referenced to a plurality of copy control types and a plurality of digital recording control data, for each copy control type there are a plurality of digital recording control data flags, at least one combination of copy control data and digital recording control data flag being associated with at least two copy management systems such that the copy management systems are applied to respective content formats.

11. A system as in claim 10, wherein said system further comprises a receiver adapted to receive a broadcast of said program.

12. A system as in claim 10, wherein said display is adapted to display said program and said instructions further comprise instructions for causing said processor to perform said identifying, said analyzing and said controlling steps before said display of said program.

13. A system as in claim 12, wherein said program requires paying money for said display of said program.

14. A system as in claim 10, wherein said system further comprises a recorder adapted for copying said program and said instructions further comprise instructions for causing said processor to perform said identifying, said analyzing and said controlling steps before said copying of said program.

15. A system as in claim 14, wherein said program requires paying money for said copying of said program.

16. A system as in claim 10, wherein said instructions further comprise instructions for causing said processor to perform the step of controlling said display to display a menu containing interactive prompts for receiving said person's input.

17. A system as in claim 16, wherein said prompts include a prompt for said person to acknowledge the presence of said copy protect data within said program.

18. A system as in claim 16, wherein said prompts include a prompt for said person to cancel a viewing of said program or a prompt for said person to cancel the display of said information.

19. A system as in claim 16, wherein said prompts include a prompt for said person to pay for a viewing of said program or a prompt for said person to pay for a recording of said program.

20. A system as in claim 10, wherein said copy protect data comprises data preventing digital and/or analog copying of said program.

21. A system as in claim 10, wherein said instructions further comprise instructions for causing said processor to perform the step of controlling said display to terminate the display of said information upon expiration of a predetermined time period.

22. A system as in claim 10, wherein said instructions further comprise instructions for causing said processor to perform the step of controlling said display to display the type of said copy protect data.

23. A method for providing a person seeking to use or view a program copy protect information regarding the program, said method comprising:
   using a processor for
   identifying the presence of copy protect data within said program;
   analyzing said copy protect data to determine the type of said copy protect data; and
   controlling a display to display to display on a screen a message concerning an analysis result of said analyzing step,
   said analyzing is based on whether the type of content included in the program is digital television content, digital audio content, or digital data content, and said analyzing is further based on the format of the content included in the program, each possible format of the content being cross-referenced to a plurality of copy control types and a plurality of digital recording control data, such that for each of digital television content, digital audio content, and digital data content there are at least three formats and each format of each type of content is cross-referenced to a plurality of copy control types and a plurality of digital recording control data,
   for each copy control type there are a plurality of digital recording control data flags, at least one combination of copy control data and digital recording control data flag being associated with at least two copy management systems such that the copy management systems are applied to respective content formats.

24. A non-transitory computer readable medium having computer executable software code stored on said medium for providing a person seeking to use or view a program copy protect information regarding the program, said code comprising instructions for causing a processor of a system to perform the steps of identifying the presence of copy protect data within said program, analyzing said copy protect data to determine the type of said copy protect data and controlling a display of said system to display on a screen a message concerning an analysis result of said analyzing, said analyzing is based on whether the type of content included in the program is digital television content, digital audio content, or digital data content, and said analyzing is further based on the format of the content included in the program, each possible format of the content being cross-referenced to a plurality of copy control types and a plurality of digital recording control data, such that for each of digital television content, digital audio content, and digital data content there are at least three formats and each format of each type of content is cross-referenced to a plurality of copy control types and a plurality of digital recording control data,
   for each copy control type there are a plurality of digital recording control data flags, at least one combination of copy control data and digital recording control data flag being associated with at least two copy management systems such that the copy management systems are applied to respective content formats.

* * * * *